United States Patent
Woodruff et al.

(10) Patent No.: US 9,439,526 B2
(45) Date of Patent: Sep. 13, 2016

(54) SYSTEM FOR ATTACHMENT OF COAT ROD AND CARGO NET

(71) Applicant: Textron Innovations, Inc., Providence, RI (US)

(72) Inventors: David D. Woodruff, Wichita, KS (US); Allan D. Schrag, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 14/581,292

(22) Filed: Dec. 23, 2014

(65) Prior Publication Data

US 2015/0289695 A1 Oct. 15, 2015

Related U.S. Application Data

(60) Provisional application No. 61/977,912, filed on Apr. 10, 2014.

(51) Int. Cl.
| | |
|---|---|
| *A47H 1/00* | (2006.01) |
| *A47G 25/06* | (2006.01) |
| *A47H 1/102* | (2006.01) |
| *A47H 1/02* | (2006.01) |
| *A47H 1/122* | (2006.01) |
| *A47F 5/00* | (2006.01) |
| *B64D 11/00* | (2006.01) |

(52) U.S. Cl.
CPC .......... *A47G 25/0692* (2013.01); *A47F 5/0006* (2013.01); *A47H 1/02* (2013.01); *A47H 1/102* (2013.01); *A47H 1/122* (2013.01); *B64D 11/00* (2013.01)

(58) Field of Classification Search
CPC ........... A47G 25/0692; A47G 25/746; A47G 25/1478; A47G 25/743; A47G 27/06; A47G 25/14; B64D 9/003; B64D 11/00; A47H 1/02; A47H 1/022; A47H 1/03; A47H 1/10; A47H 1/102; A47H 1/12; A47H 1/122; A47H 1/14; A47H 1/142; A47H 2001/006; A47H 2001/0215; A47K 10/04; A47K 10/10; A47K 10/18; A47B 61/003; A47B 43/003; A47B 43/006; A47B 61/02; B65D 85/185; D06F 57/12; A47F 5/0884; A47F 5/0006; A47F 2005/0012; A47F 7/143; A47F 5/08; A47F 5/0892
USPC ............. 211/105.3, 123, 85.3, 105.1, 105.5, 211/105.6, 204, 206, 87.01, 113, 100, 101, 211/193, 119.003, 118, 124, 175, 119.011; 248/251, 690, 693, 301, 304, 339, 248/354.1, 351; 410/144–146, 149, 153; 224/311, 543, 547, 927, 545, 555, 558, 224/560, 561, 275, 932, 405, 482, 313
See application file for complete search history.

(56) References Cited

U.S. PATENT DOCUMENTS

| | | | | |
|---|---|---|---|---|
| 2,488,702 A | * | 11/1949 | Brochstein | ......... A47G 25/0692 211/123 |
| 2,983,231 A | * | 5/1961 | Henrikson | ................ B60P 7/15 248/357 |
| 3,151,571 A | * | 10/1964 | Heard | ................... B61D 45/001 410/149 |
| 3,570,412 A | * | 3/1971 | Holman, Jr. | ......... B61D 45/001 211/105.6 |

(Continued)

*Primary Examiner* — Joshua Rodden
*Assistant Examiner* — Hiwot Tefera
(74) *Attorney, Agent, or Firm* — Erise IP, P.A.

(57) ABSTRACT

A system for quickly attaching and detaching a coat rod or cargo restraint system to the interior surfaces of an aircraft to optimize the limited space aboard an aircraft.

9 Claims, 6 Drawing Sheets

(56) References Cited

U.S. PATENT DOCUMENTS

| | | | | |
|---|---|---|---|---|
| 3,774,939 A * | 11/1973 | Freads | B60P 7/15 | 410/149 |
| 3,782,295 A * | 1/1974 | Balinksi | B61D 45/001 | 410/149 |
| 3,799,070 A * | 3/1974 | Munson | B61D 45/001 | 410/149 |
| 3,836,174 A * | 9/1974 | Holman, Jr. | B60P 7/15 | 211/105.6 |
| 4,142,809 A * | 3/1979 | Shell | F16B 12/34 | 248/251 |
| 4,256,425 A * | 3/1981 | Burgess | B61D 45/00 | 410/149 |
| 4,332,515 A * | 6/1982 | Twyman | B63B 25/24 | 410/145 |
| 4,650,383 A * | 3/1987 | Hoff | B60P 7/15 | 410/149 |
| 5,104,269 A * | 4/1992 | Hardison | B61D 45/00 | 211/105.3 |
| 5,186,341 A * | 2/1993 | Zeid | A47B 61/003 | 211/123 |
| 5,813,566 A * | 9/1998 | Bradford | B65D 19/18 | 206/298 |
| 6,119,908 A * | 9/2000 | Reichenberger | B60R 9/045 | 224/321 |
| 6,145,170 A | 11/2000 | Bernard et al. | | |
| 6,371,342 B2 | 4/2002 | Larsen | | |
| 6,793,449 B1 | 9/2004 | Simpson et al. | | |
| 6,908,269 B1 * | 6/2005 | Youngs | B60P 7/0807 | 410/100 |
| 8,540,198 B2 * | 9/2013 | Keyvanloo | A47F 5/0823 | 248/220.21 |
| 8,991,625 B2 * | 3/2015 | Bucklew | A47H 1/022 | 211/105.2 |
| 9,131,795 B2 * | 9/2015 | Didehvar | A47H 1/022 | |
| 2004/0124222 A1 | 7/2004 | Richter | | |

* cited by examiner

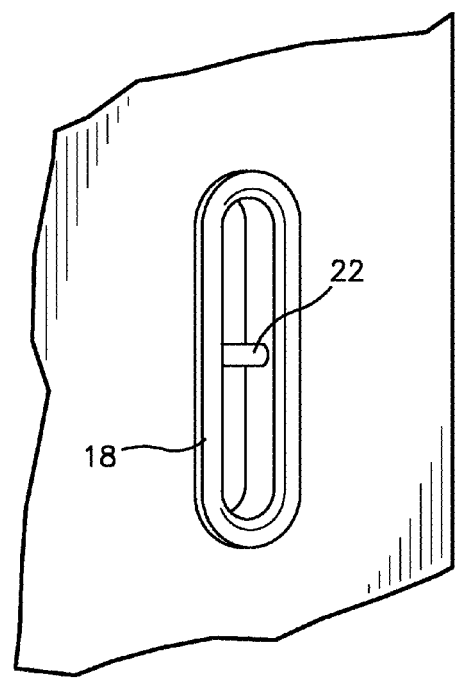
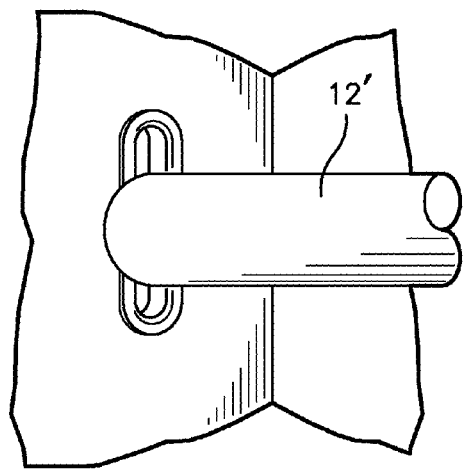 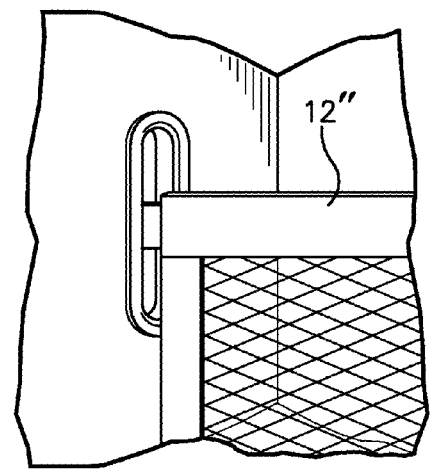
Fig. 3
Fig. 4          Fig. 5

SYSTEM FOR ATTACHMENT OF COAT ROD AND CARGO NET

RELATED APPLICATION

This application claims the benefit of priority to U.S. Provisional Application No. 61/977,912 filed Apr. 10, 2014, the disclosure of which is incorporated herein by reference.

TECHNICAL FIELD

The disclosed technology is directed to a system for expeditiously, yet securely, attaching and detaching a coat rod to the interior wall surfaces of an aircraft.

BACKGROUND

Space on aircraft is limited and must be utilized optimally in order to increase the cost effectiveness of the use of the aircraft. Cargo restraint nets and barrier nets are commonly used in the transport industry to form screens which restrict the movement of cargo in the cargo hold of an aircraft or even in the passenger cabin while in transit.

The ability to quickly convert space in the cabin of an aircraft greatly facilitates the capacity and utilization of the aircraft. Because of the speeds at which aircraft operate it is critical that a system be utilized to restrain objects so that they do not become projectiles in the event of sudden elevation or speed changes that may come about due to any number of reasons.

Previously coat rods and cargo nets utilized special hardware which protruded in to the interior space of the aircraft closet or cabin area. The bezels and mounting plates to install and interchange the coat rod and cargo net mounting hardware required time and effort to interchange.

For the foregoing reasons, there is a need for a system to quickly install and interchange a coat rod and cargo system based upon the specific needs of the passengers and flight crew of the aircraft.

SUMMARY

A first embodiment of the disclosed technology employs a bracket with a cross member imbedded in a wall panel in the aircraft cabin. The bracket face extends only nominally beyond the face of the panel and allows for a hook to be attached to the bracket cross member which will allow a rod with an integral hook to be hung on the bracket. This design importantly allows for easy attachment of a rod without any exposed bracket hardware which would be a danger to cabin occupants should they inadvertently impact the cabin wall.

Various objects, features, aspects and advantages of the inventive subject matter will become more apparent from the following detailed description of preferred embodiments, along with the accompanying drawings in which like numerals represent like components.

BRIEF DESCRIPTION OF THE DRAWINGS

FIG. 3 depicts a perspective view of an embodiment of a wall bracket with a transversely oriented member positioned within a wall;

FIG. 4 depicts an embodiment of a rod apparatus engaged with a wall bracket;

FIG. 5 depicts an embodiment of a webbed mesh engaged with a wall bracket;

DETAILED DESCRIPTION

Figure 1:
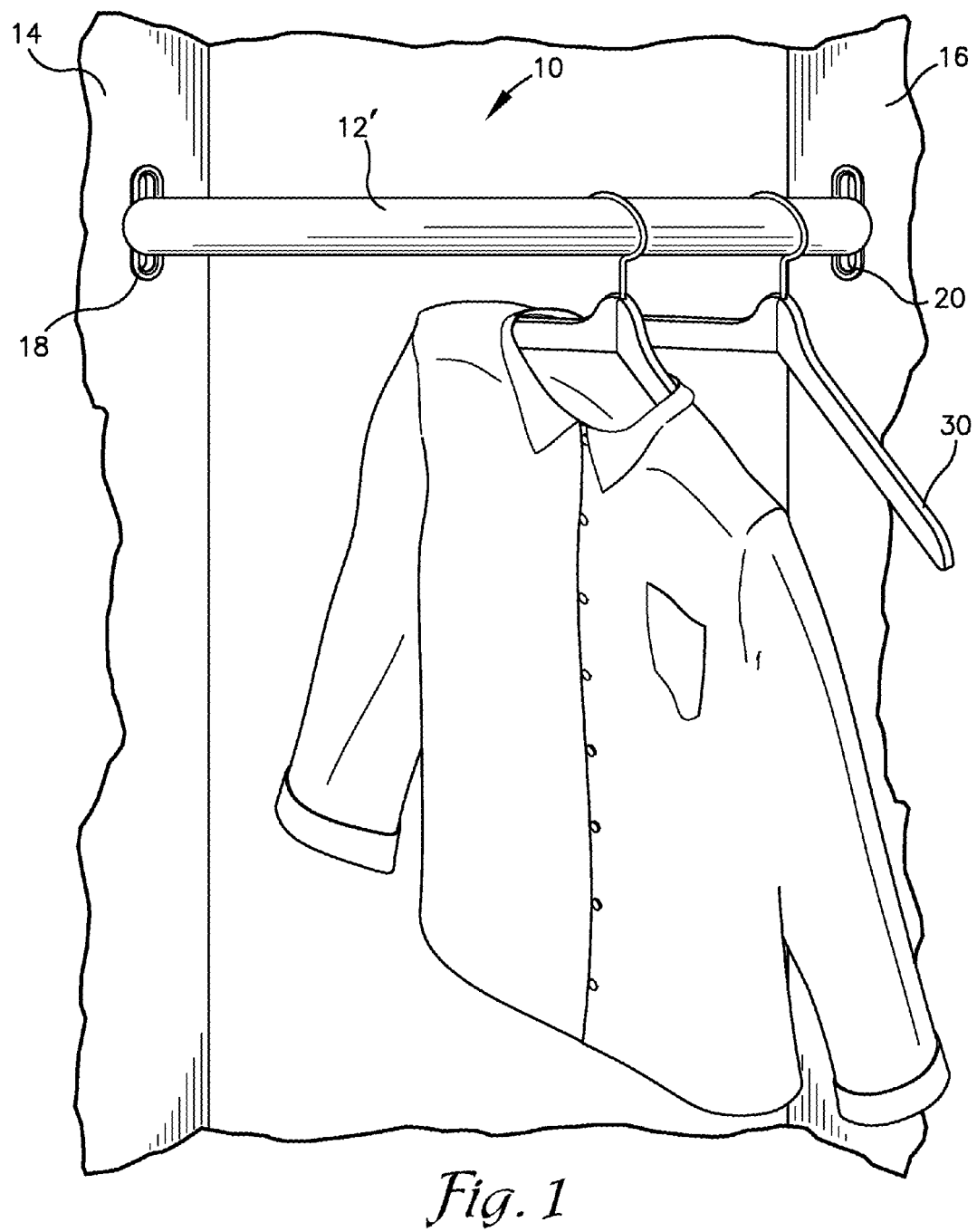
FIG. 1 depicts an embodiment of an apparatus for fastening a rod suspended between two walls.
Figure 2:
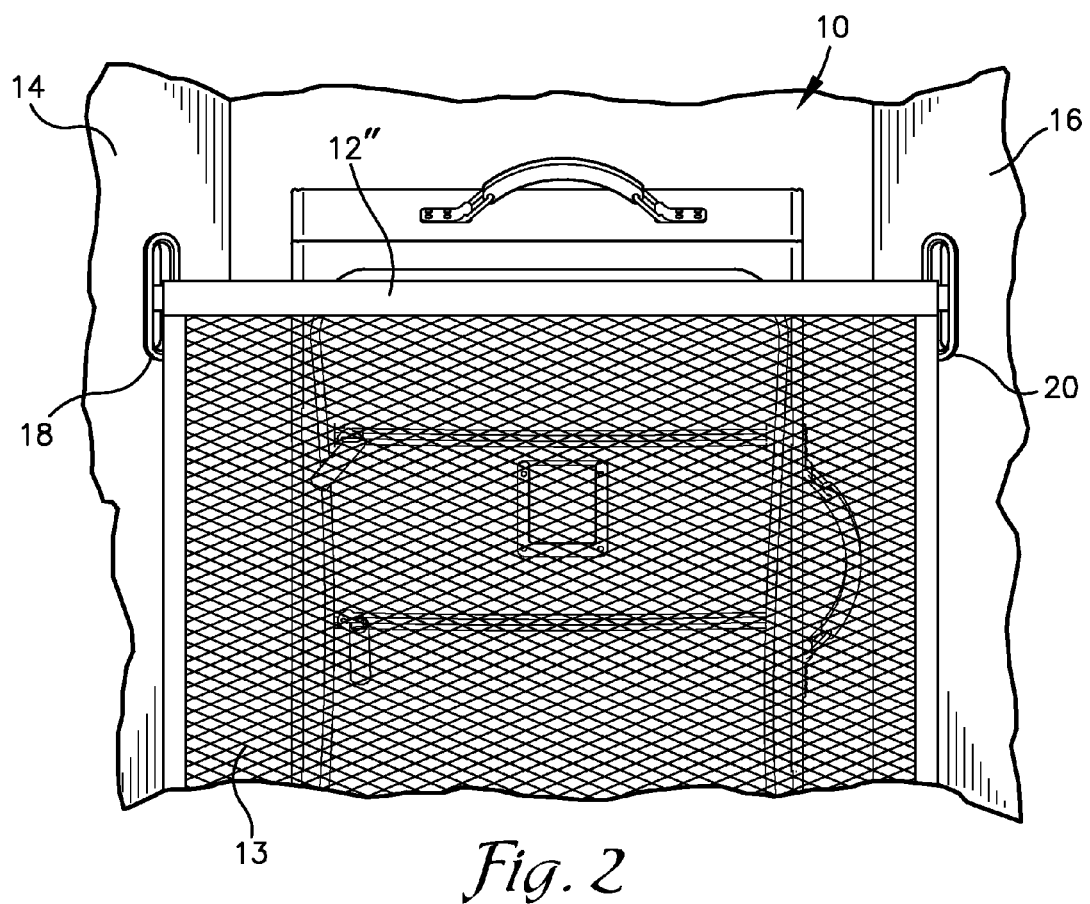
FIG. 2 depicts an embodiment of an apparatus for fastening a mesh suspended between two walls.
Figure 6:
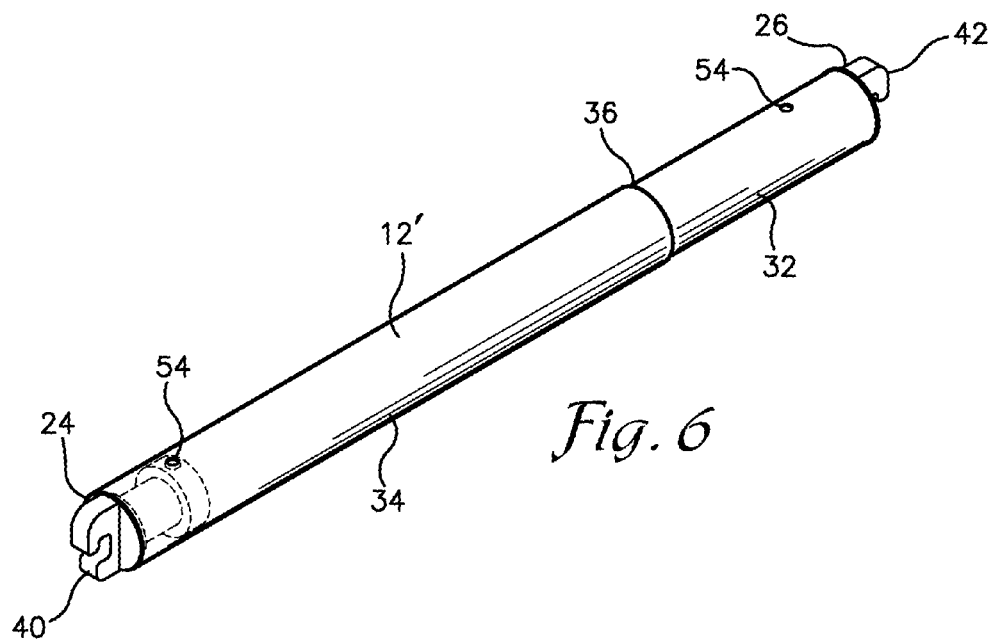
FIG. 6 depicts an embodiment of the telescoping support rods with engagement members at each end.
Figure 7:
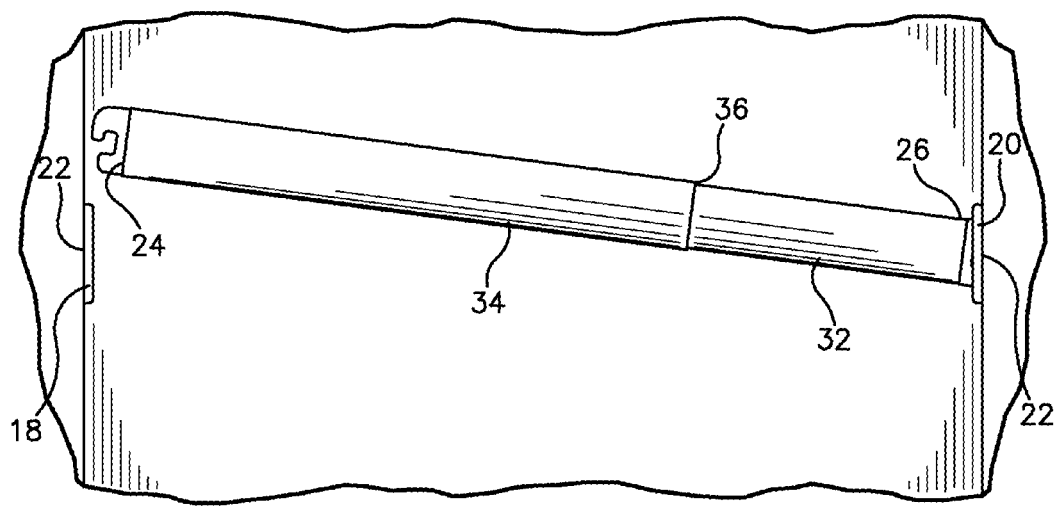
FIG. 7 depicts an embodiment of the telescoping support rods with an end in engagement with a wall bracket.

As shown in FIG. 1 a first embodiment of the disclosed technology details a system 10 for detachably securing a spanning member 12 to a first and second structural wall 14, 16. The spanning member 12 may be a rigid rod 12' or the reinforced fabric edge 12" of a cargo net 13 as seen in FIGS. 4 and 5. As seen in FIG. 2, the system 10 includes wall brackets 18, 20 for mounting to the first and second structural walls 14, 16. As best seen in FIG. 3, the wall brackets further comprise a transversely oriented member 22. As seen in FIG. 6, the member 12' for spanning the distance between the first and second structural walls 14, 16 includes a first and second end 24, 26.

Focusing now on the rigid rod 12' of the disclosed technology the preferred embodiment can be seen in FIG. 6. The rod 12' is preferably circular in cross section to accommodate standard configuration clothes hangers 30 as seen in FIG. 1. Alternative cross sectional configurations such as square, or rectangular, may also be accommodated with this design. The rigid rod 12' is also preferably comprised of two separate tubular telescoping components 32, 34 which facilitates engagement with wall brackets 18, 20 that may be located at varying distances depending upon the aircraft or vehicle into which the spanning member 12 is utilized. As seen in FIG. 6, tube 32 has a nominally smaller diameter than tube 34 such that there is no interference between the two tubes when the smaller tube 32 is inserted into the larger tube 34. FIG. 6 further reveals the telescoping insertion type engagement between the two tubes 32, 34 at the ring of entry 36 of the smaller tube 32. Importantly, the difference in the diameters between the two tubes 32, 34 must be nominal so that the tubes readily telescope and the full force of the load applied by the items hung on the rigid rod does not rest on leading edges of the tubes 32, 34. In other words, if the tubes 32, 34 are properly sized, the weight resting atop the telescoping rod 12' will be evenly distributed along the length of the tube and not concentrated at the leading edges of the tubes. Because light weight and durability are preferred characteristics of the tube design, the tubes are preferably fabricated from aluminum and are fabricated as thin walled tubes with a wall thickness of less than 0.050 inches.

Figure 8:
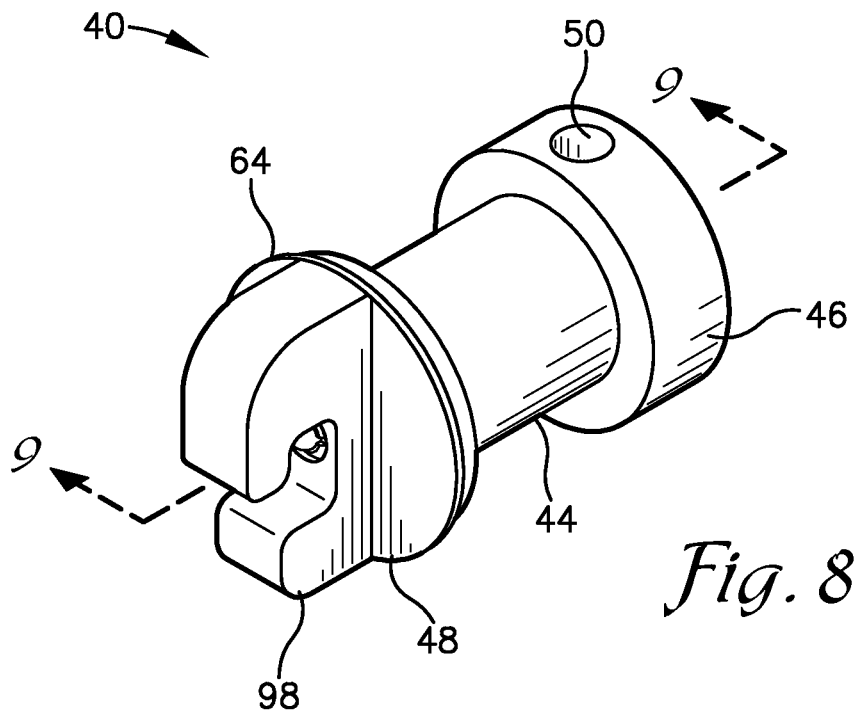
FIG. 8 depicts an embodiment of an engagement element for supporting the rod member in position.

Extending outwardly from the first and second ends 24, 26 are engagement elements 40, 42. In FIG. 8, the engagement elements include a center span 44 that extends between the insertion ring 46 and the locking element 48 and is of a lesser diameter than the insertion ring 46. The engagement elements 40, 42 also include a longitudinal axis that runs along the center of rotation of the center span 44. The diameter of the insertion ring 46 is nominally less than the diameter of the tube 32, 34 into which it is to be inserted. The outer diameter of the insertion ring 46 must not interfere with the interior wall diameter of the tube 32, 34 into which it is to be inserted but is preferably a slip fit.

Figure 9:
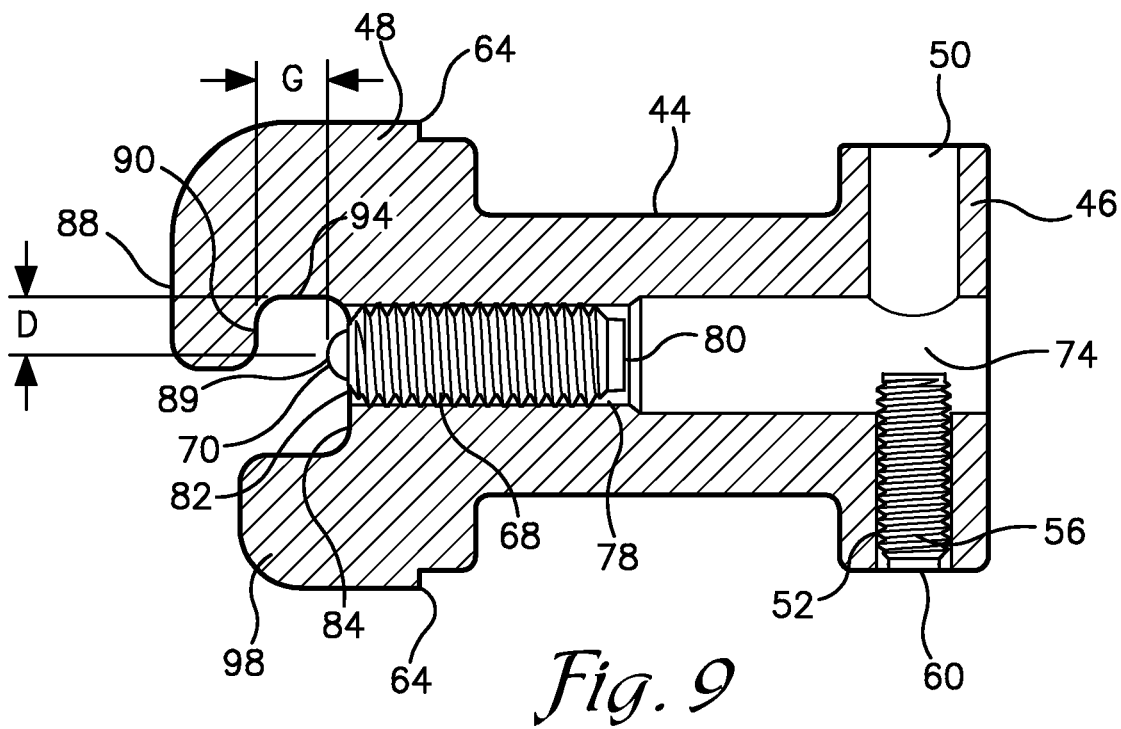
FIG. 9 is a cutaway along line 9-9 of FIG. 8 of the engagement member.
Figure 9A:
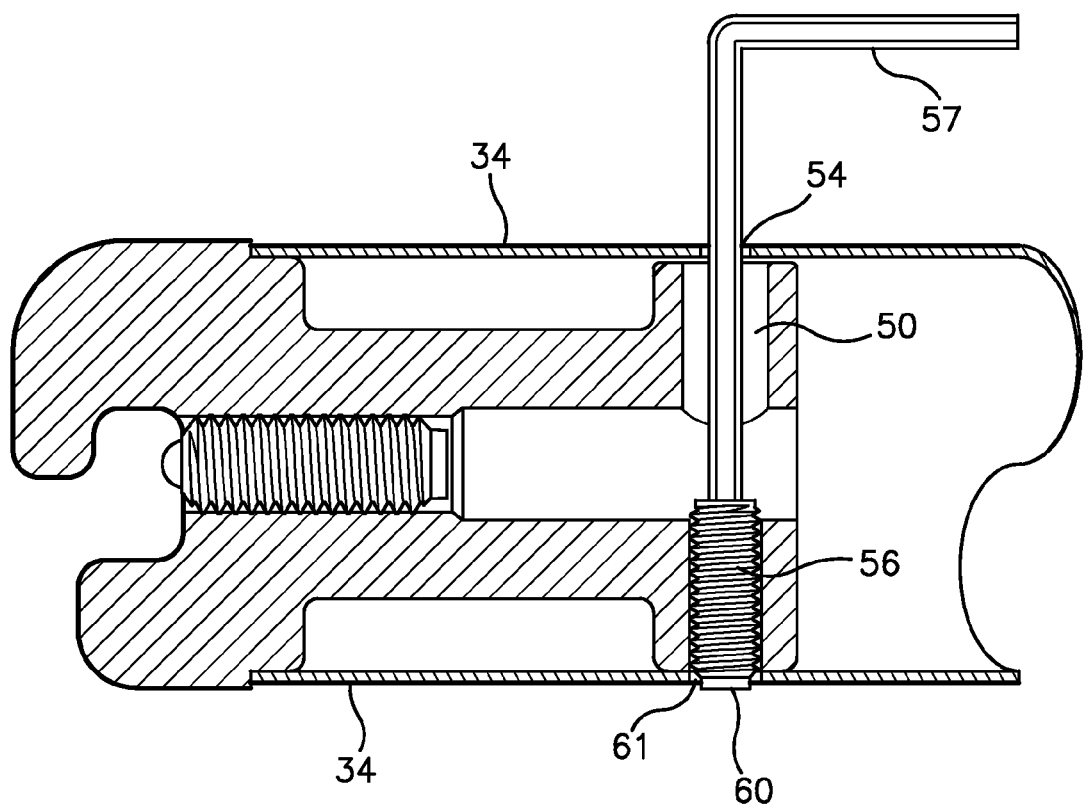
FIG. 9A is an embodiment of the engagement member shown in FIG. 9 for supporting the rod member in position as shown inserted into an end segment of the tube member with a hex wrench inserted through the tube member.

FIGS. 8 and 9 further detail that the insertion ring 46 includes a bore 50 extending through the center of rotation of the ring 46. The first bore 50 on the circumference of the insertion ring 46 is unthreaded. 180 degrees opposite the first bore 50 is the threaded segment 52. The smooth bore 50 is preferably of a diameter in the range of 0.15 to 0.20 inches for purposes of accommodating the insertion of a hex wrench, as shown in FIG. 9A, through an opening 54 in each end of the tubes 32, 34 to facilitate rotation of a set screw 56 threaded into the threaded bore 52. The set screw 56 may be a hex cap screw, for example a #10-32 cap screw according to the unified thread standard. As seen in FIG. 9A, rotation of the set screw 56 by a hex wrench 57 allows the head 60 of the set screw 56 to enter into a bore 61 opposite the first opening 54 on the tube circumference, rigidly locking the engagement elements 40, 42 into position so that the engagement elements do not inadvertently dislodge from the ends 24, 26 of the tubes 32, 34.

As seen in FIGS. 8-9, opposite the insertion ring 46 is the locking element 48. The locking element 48 includes a flange 64 that abuts the ends 24, 26 of the tubes 32, 34 when the insertion ring 46 portion of the locking element 48 is inserted into the tubes 32, 34. The flange 64 facilitates a consistent and even engagement of the locking element 48 against the ends 24, 26 of the tubes.

FIG. 9 also reveals the positioning of a spring plunger 68 with a ball nose 70. The ball nose 70 of the spring plunger 68 is capable of being retracted, a nominal distance, when sufficient pressure is applied to the ball nose. During assembly, the spring plunger 68 is inserted into the oversized second smooth bore 74 located along the center of rotation of the center span 44. The second smooth bore 74 leads into a threaded segment 78 configured for mating with the threads on the spring plunger 68. An exemplary spring plunger 68 is manufactured by McMaster-Carr® and utilizes a ¼-28 UNF thread for insertion into the threaded segment 78. The distal face 80 of the spring plunger 68 typically includes a screw driver slot (not shown) for rotationally advancing the spring plunger 68 to the desired position within the threaded segment 78. The spring plunger 68 is advanced to create the distance "G", which is preferably, slightly less than the diameter of the transversely oriented member 22.

As again seen in FIG. 9, the locking element 48 extends outwardly into a curved hook 88 configuration. In addition, a distance "D" exists that extends between the tip 89 of the ball nose 70 and the horizontally oriented interior surface 94 of the locking element 48. When the transversely oriented member 22 of the wall bracket 18 is inserted into the area of the hook 88, the ball nose 70 on the spring plunger 68 will retract allowing passage of the transversely oriented member 22 past the ball nose 70 and into the unobstructed space above the ball nose 70. Once the full diameter of the transversely oriented member 22 passes the tip 89 of the ball nose, the ball nose 70 will seek to return to its fully extended position. Once the ball nose 70 returns to its fully extended position the locking element is secured to the transversely oriented member 22 and the prospect of inadvertent release from the wall bracket 18 is greatly reduced. To further enhance the capability of the engagement element 40, 42 in securing the attachment to the wall bracket 18, a lower protruding jaw 98 extends outwardly from the locking element 48 and beneath the ball nose 70. The protruding jaw 98 serves to prevent the locking element 48 from inadvertently disengaging causing the end of the rod 12' to drop.

In operation, the brackets 18 are installed into the wall such that the transversely mounted member 22 is horizontally disposed. Next, the user manually extends or shortens the tubes 32, 34 to the desired span by telescoping the two tubes to achieve the desired length. In order to secure the locking members 48 to the wall brackets 18, the user will place the hook 88 on the backside of the member 22 and slide the member past the tip 89 of the ball nose 70 of the spring plunger 68. As the member 22 slips past the tip 89 of the ball nose 70 the ball nose begins to rebound to its original position thereby securing the locking members 48 in position and preventing their inadvertent release.

Once the first locking member is in position, the process outlined above is repeated to secure the second locking member 48 into position. Once in position, the telescoping rod is capable of supporting clothing on hangers and can be readily detached from the wall bracket 18 by reversing the procedure outlined immediately above.

While the preferred form of the present invention has been shown and described above, it should be apparent to those skilled in the art that the subject invention is not limited by the figures and that the scope of the invention includes modifications, variations and equivalents which fall within the scope of the attached claims. Moreover, it should be understood that the individual components of the invention include equivalent embodiments without departing from the spirit of this invention.

It will be understood that certain features and subcombinations are of utility and may be employed without reference to other features and subcombinations and are contemplated within the scope of the claims. Not all steps listed in the various figures need be carried out in the specific order described.

We claim:

1. A system for supporting a rod between a first surface and an opposing second surface, the system comprising:
    a first and second wall bracket positioned within the first and second surfaces wherein the first and second wall brackets each include a transversely mounted attachment member recessed within the bracket at approximately the center of the bracket;
    a first hollow rod with a first and second end;
    a second hollow rod with a first and second end, the first hollow rod capable of insertion into and adjustable longitudinally within the second hollow rod, the first and second rods forming a longitudinal axis;
    a first engagement member configured for receipt into the second end of the first hollow rod; and
    a second engagement member configured for receipt into the second end of the second hollow rod wherein the second engagement members further comprises:
    a hook shaped portion including an axially-outwardly extending member at a first end of a substantially vertical body, the axially-outwardly extending member having a downward bend at the first end of the substantially vertical body;
    the extending member, bend, and body together defining an area for receiving the transversely oriented attachment member;
    a protruding lower jaw at a second end of the substantially vertical body below the hook portion, the protruding lower jaw cooperates with the hook portion to prevent disengagement of the second end of the second rod; and a spring biased member for securing the engagement members in position at the first and second wall brackets.

2. The system of claim 1, wherein the first and second engagement members further comprise a threaded member for securing the engagement member to the respective hollow rod.

3. The system of claim 1, wherein the first and second engagement members further comprise an insertion ring for receipt into the first and second hollow rods.

4. The system of claim 1, wherein the spring biased member further comprises a spring plunger with a ball nose extending coincident with the longitudinal axis.

5. The system of claim 1, wherein the second engagement member has a substantially similar configuration to the first engagement member.

6. The system of claim 1, wherein the axially-outwardly extending member of the hook shaped portion has a substantially 90 degree bend at the first end of the substantially vertical body.

7. A system for supporting a rod between a first surface and an opposing second surface, the system comprising:
a first and second wall bracket positioned within the first and second surfaces wherein the first and second wall brackets each include a transversely mounted attachment member recessed within the bracket;
a expandable rod having a first end and a second end, the expandable rod capable of insertion between the first and second surfaces;
a first engagement member having a face and being located at the first end of the expandable rod; and
a second engagement member located at the second end of the expandable rod wherein the first engagement member further comprises: (i) a hook shaped portion that extends out from the face and then bends down; and (ii) a protruding lower jaw which extends out from the face at a location below the hook portion;
the hook and lower jaw together defining an area for receiving the first attachment member to prevent disengagement.

8. The system of claim 7 comprising:
a spring biased member for securing the first engagement member in position at the first wall bracket.

9. The system of claim 7 wherein the second engagement member located at the second end of the expandable rod has substantially the same configuration as the first engagement member.

* * * * *